(12) United States Patent
Bell et al.

(10) Patent No.: US 10,941,883 B2
(45) Date of Patent: Mar. 9, 2021

(54) LOW-PIM STACKING CABLE HANGER SPACER

(71) Applicant: ConcealFab Corporation, Colorado Springs, CO (US)

(72) Inventors: Thomas Bell, Colorado Springs, CO (US); Steve Rogers, Colorado Springs, CO (US)

(73) Assignee: ConcealFab Corporation, Colorado Springs, CO (US)

( * ) Notice: Subject to any disclaimer, the term of this patent is extended or adjusted under 35 U.S.C. 154(b) by 0 days.

(21) Appl. No.: 16/591,703

(22) Filed: Oct. 3, 2019

(65) Prior Publication Data

US 2020/0109800 A1    Apr. 9, 2020

Related U.S. Application Data

(60) Provisional application No. 62/740,469, filed on Oct. 3, 2018.

(51) Int. Cl.
| | |
|---|---|
| F16L 3/22 | (2006.01) |
| F16L 3/13 | (2006.01) |
| H02G 7/05 | (2006.01) |
| H02G 3/32 | (2006.01) |
| F16L 3/10 | (2006.01) |

(52) U.S. Cl.
CPC ............ *F16L 3/221* (2013.01); *F16L 3/1058* (2013.01); *F16L 3/13* (2013.01); *H02G 3/32* (2013.01); *H02G 7/053* (2013.01)

(58) Field of Classification Search
CPC ....... F16L 3/221; F16L 3/1058; F16L 21/078; F16L 3/13; H02G 3/32; H02G 7/053
See application file for complete search history.

(56) References Cited

U.S. PATENT DOCUMENTS

| | | | |
|---|---|---|---|
| 4,595,185 | A | 6/1986 | Kitagawa |
| 5,794,897 | A | 8/1998 | Jobin et al. |
| 6,354,543 | B1 | 3/2002 | Paske |
| 6,443,402 | B1 | 9/2002 | Ferrill et al. |
| 6,899,305 | B2 | 5/2005 | Korczak et al. |

(Continued)

OTHER PUBLICATIONS

Vaccaro et al., U.S. Appl. No. 62/686,882, filed Jun. 19, 2018.

(Continued)

*Primary Examiner* — Eret C McNichols
(74) *Attorney, Agent, or Firm* — Mehrman Law Office; Michael J. Mehrman (57) ABSTRACT

A low-PIM, stackable polymeric cable hanger spacer that includes a polymeric base forming a rim that defines a latch surface for capturing locking metal barbs of interface brackets of a metal snap-in cable hanger. The spacer also includes polymeric legs extending from the polymeric base with polymeric barbs for latching to an adjacent snap-in cable hanger or other support member. The base allows the metal barbs to pass through the base when the metal barbs are deflected or compressed toward each other. and then allows the metal barbs to spring back to engage the latch surface and become captured by the polymeric spacer once the metal barbs clear of the rim. The base may have a round toroidal shape with rounded edges allowing the metal snap-in cable hanger to rotate with respect to the spacer.

18 Claims, 7 Drawing Sheets

(56) References Cited

U.S. PATENT DOCUMENTS

| | | |
|---|---|---|
| 7,097,142 B1* | 8/2006 | Schmidt .................... F16L 3/12 |
| | | 248/68.1 |
| 8,011,621 B2 | 9/2011 | Korczak |
| 8,439,316 B2 | 5/2013 | Feige |
| 9,086,175 B2 | 7/2015 | Feige |
| 9,853,434 B2 | 12/2017 | Vaccaro |
| 9,866,004 B2 | 1/2018 | Vaccaro |
| 9,903,510 B2 | 2/2018 | Joshi et al. |
| 9,995,414 B2 | 6/2018 | Joshi et al. |
| 10,158,218 B2 | 12/2018 | Vaccaro et al. |
| 10,243,339 B2 | 3/2019 | Vaccaro et al. |
| 10,253,906 B2 | 4/2019 | Vaccaro |
| 10,422,446 B2 | 9/2019 | Joshi et al. |
| 10,508,757 B2 | 12/2019 | Vaccaro et al. |
| 2002/0005463 A1 | 1/2002 | Paske et al. |
| 2002/0066833 A1 | 6/2002 | Ferrill et al. |
| 2006/0249633 A1* | 11/2006 | Korczak .................... F16L 3/24 |
| | | 248/62 |
| 2006/0249634 A1* | 11/2006 | Van Walraven ........ F16B 21/02 |
| | | 248/71 |
| 2009/0294602 A1 | 12/2009 | Korczak |
| 2011/0226913 A1 | 9/2011 | Feige |
| 2014/0086704 A1 | 3/2014 | Hemingway et al. |
| 2016/0281881 A1* | 9/2016 | Vaccaro ................... H02G 3/32 |
| 2017/0122460 A1 | 5/2017 | Joshi et al. |
| 2018/0172183 A1* | 6/2018 | Joshi ........................ H02G 1/00 |
| 2018/0238473 A1* | 8/2018 | Meola ..................... F16L 3/243 |
| 2019/0383426 A1 | 12/2019 | Vaccaro et al. |
| 2020/0003338 A1 | 1/2020 | Vaccaro et al. |
| 2020/0088323 A1* | 3/2020 | Vaccaro ................... H02G 3/32 |

OTHER PUBLICATIONS

SitePro1 a Valmont Company (website), https://www.sitepro 1 .com/store/cart. ph p?m=product_list&c=1, Oct. 21, 2006.

Petrilla Technologies, LLC (website), https://petrillatechnologies. com/support-accessories.html, Mar. 24, 2017.

CommScope (website), https://www.commscope.com/catalog/tools_ accessories/product.aspx?id=46, Oct. 28, 2012.

\* cited by examiner

LOW-PIM STACKING CABLE HANGER SPACER

REFERENCE TO RELATED APPLICATION

This application claims priority to U.S. Provisional Patent Application Ser. No. 62/740,469 filed Oct. 3, 2018, which is incorporated by reference.

TECHNICAL FIELD

The present invention is directed to cellular communication systems and, more particularly, to a low-PIM stacking cable hanger spacer used to separate metal cable hangers from touching each other or from touching metal support members to reduce passive intermodulation interference (PIM) at cellular telephone base station antenna sites.

BACKGROUND

An essential element of modern mobile communications systems is the cellular telephone base station, also known as a "cell site." The cell site includes one or more directional base station antennas aimed at a desired geographical area of coverage with coaxial cables connecting the antennas to base station radio equipment. The performance of a cell site is often limited by passive intermodulation (PIM) interference. PIM interference occurs when the high-power downlink signals transmitted by the base station antennas mix at passive, non-linear junctions in the RF path, creating new signals known as intermodulation products. When these intermodulation products fall in an operator's uplink band, they act as interference and reduce the SINR (signal to interference plus noise ratio). As the SINR is reduced, the geographic coverage and data capacity of the cell site is reduced.

It is well documented that loosely touching metal-to-metal surfaces can behave in a non-linear fashion and become sources of PIM interference when illuminated by high power RF (radio frequency) signals. Recently, it has been determined that loose metal-to-metal connections located behind base station antennas are also able to generate high levels of PIM interference. Even though this region is well outside the main beam of the antenna, enough RF energy is present in this region to excite non-linear objects and generate PIM interference. Based on field measurements it has been determined that loose metal-to-metal contacts located very close to base station antennas (within 1 wavelength of the carrier frequency) are more likely to generate high levels of PIM interference than loose metal-to-metal contacts located farther away (greater than 1 wavelength) from base station antennas.

A common source of loose metal-to-metal contact found in the region close to the base station antenna is metal brackets and associated hardware for supporting coaxial cables. Coaxial cables, typically ½-inch in diameter, are used to transfer RF signals between tower mounted radio equipment and the base station antenna. These cables need to be mechanically supported periodically along their length to prevent movement of the cable in the wind. The metal antenna mounting pipe close to the back of the base station antenna provides a convenient rigid surface to mechanically secure these coaxial cables. At operating frequencies at or below 2 GHz, this mounting pipe is typically located within 1 wavelength of the antenna within the zone of high PIM concern.

Two different methods for mechanically supporting coaxial cables are commonly found at cell sites. The first utilizes two plastic clamp blocks that fit around one or more coaxial cables. An example of this style cable support block is disclosed in Jobin et al., U.S. Pat. No. 5,794,897, which is incorporated by reference. A ⅜-inch or 10 mm diameter stainless steel threaded fastener is inserted into the support block pairs and stainless-steel hardware is installed to clamp the plastic block halves together on the threaded fastener. A steel interface bracket is often attached to one end of the threaded fastener using nuts and lock washers. The interface bracket is then secured to the antenna mounting pipe or other nearby metal members using a stainless-steel hose clamp. The hose clamp provides a convenient method for securing interface brackets to metal members since the hose clamp conforms easily to different shapes and is adjustable in length allowing it to fit around a wide variety of metal member sizes.

Another common system used for mechanically supporting coaxial cables uses metal "snap-in" style cable support hangers. The snap-in cable support hangers are made from thin "U" or "C" shaped stainless-steel members designed to wrap around individual coaxial cables. The hangers include locking features able to insert into round holes in supporting interface brackets. Once inserted, the locking features on the hanger expand outward to secure the cable to the interface bracket. A variation of this style cable hanger design includes a hole on one end of the hanger to accept an additional cable hanger. This enables multiple coaxial cables to be secured to a single interface bracket by stacking one hanger on top of another. Examples of this style cable hanger are disclosed in Paske, U.S. Pat. No. 6,354,543 and Feige, U.S. Pat. No. 8,439,316.

A problem with these conventional designs is that PIM can be generated at the metal-to-metal contacting surfaces between stacked metal snap-in style cable hangers and at the metal-to-metal contacting surface between the interface bracket and the snap-in hanger. Manufacturers such as Commscope have introduced plastic versions of their stackable snap-in style cable support hangers that eliminate the metal-to-metal contacting surfaces that generate PIM. These all-plastic snap-in cable hangers, however, introduce new problems. First, the all-plastic snap-in hangers are not as strong as the all-metal snap-in hangers. This limits the number of cables that can be reliably stacked on top of each other for a given support spacing. The all-plastic snap-in hangers are also prone to breaking, for example during installation when the plastic locking features are overstressed due to misalignment.

A second problem with all-plastic snap-in hangers is that the plastic material used to produce these hangers is not able to bite into the cable jacket as effectively as all-metal snap-in hangers. This reduces the all-plastic hanger's ability to prevent longitudinal movement of the cable due to wind forces or due to gravity when the cable is oriented vertically.

A third problem with the existing all-plastic snap-in hangers is that they are not able to rotate at the hanger-to-hanger interface. Due to geometry constraints, the all-plastic hangers are only able to connect to one another in a fixed orientation. This requires all supported cables to be parallel to each other at the point of support. Cables that are not perfectly parallel stress the plastic supports, leading to breakage. Mechanical stress is also imposed on the RF cable, leading to cable deformation and reduced RF performance.

An improved low-PIM snap-in style cable hanger is therefore needed to overcome the limitations of the existing alternatives.

SUMMARY

The present invention meets the needs described above through a low-PIM, stackable cable hanger spacer to reduce PIM (passive intermodulation) interference at cellular telephone base station antenna sites. A representative low-PIM, stackable polymeric cable hanger spacer includes a polymeric base forming a rim that defines a latch surface for capturing the locking metal barbs of the interface brackets of a conventional metal snap-in cable hanger. The spacer also includes polymeric legs extending from the polymeric base with polymeric barbs for latching to an adjacent metal snap-in cable hanger or other support member. The base allows the metal barbs to pass through the base when the metal barbs are deflected or compressed toward each other, and then spring back to engage the latch surface and become captured by the polymeric spacer once the metal barbs clear of the rim.

The base may have a round toroidal shape with rounded edges allowing the metal snap-in cable hanger to rotate with respect to the spacer. The rim typically has an internal diameter corresponding to a nominal spacing of the metal barbs of the metal snap-in cable hanger when the cable hanger is pinched closed around a cable that the cable hanger is designed to support. In a particular embodiment, the rim has an internal diameter corresponding to a ¾ inch nominal spacing of the metal barbs of the cable hanger when the cable hanger is pinched closed around a nominal ½ inch, ⅝ inch, ⅞ inch, 1¼ inch or 1⅝ inch diameter cable that the cable hanger is designed to support. The illustrative spacer is made from a UV-stable polymer, such as glass-filled Nylon, which may be injection-molded in sections that are solvent welded or adhesive bonded together to form a complete spacer.

It will be understood that specific embodiments may include a variety of features in different combinations, as desired by different users. The specific techniques and systems for implementing particular embodiments of the invention and accomplishing the associated advantages will become apparent from the following detailed description of the embodiments and the appended drawings and claims.

BRIEF DESCRIPTION OF THE FIGURES

The numerous advantages of the embodiments of the invention may be better understood with reference to the accompanying figures.

DETAILED DESCRIPTION

Embodiments of the invention include a low-PIM polymeric spacer for use with a conventional metal snap-in cable hanger and an assembly including a polymeric spacer and a metal snap-in cable hanger. These embodiments may be utilized in concert with other techniques to reduce PIM at cellular base stations, such as the low-PIM cable bracket described in commonly owned U.S. patent application Ser. Nos. 16/450,925 and 16/581,597, which are incorporated by reference.

An illustrative embodiment of the polymeric spacer Includes a base forming a rim that defines a latch surface configured to capture the locking metal barbs of the interface brackets of the metal snap-in cable hanger. For example, the base may be a collar, plate or other suitable structure. The base allows the metal barbs to pass through when they are deflected or compressed toward each other. Once they clear of the rim, the metal barbs of the cable hanger spring back to engage the latch surface and become captured by the polymeric spacer. The base of the spacer has a round toroidal shape with rounded edges allowing the cable hanger to rotate freely at the interface with the spacer. Similarly, the spacer also includes polymeric legs with polymeric barbs configured to latch to the flange of an adjacent snap-in cable hanger. The flange allows the polymeric barbs to pass through when they are deflected or compressed toward each other. Once clear of the flange, the polymeric barbs of the spacer spring back to engage the flange and become captured by the adjacent snap-in cable hanger. The polymeric barbs allow the adjacent cable hanger to rotate freely at the interface with the spacer.

The latch surface typically forms a middle section below the rim that has a larger internal diameter allowing the locking barbs of the metal snap-in cable hanger to expand outward to become captured by the latch surface. This secures the cable hanger to the spacer preventing vertical separation. The bottom section of the spacer includes polymeric legs designed to secure the spacer to the receptacle hole in an adjacent metal snap-in cable hanger or other mounting member. The rim of the spacer may have an internal diameter corresponding to a nominal spacing of the metal barbs of the cable hanger when the cable hanger is pinched closed around a cable that the cable hanger is designed to support.

In a particular embodiment, the rim of the base of the spacer has an internal diameter of about ¾ inches, which matches the diameter of typical metal snap-in cable hanger interface brackets. In other word, the internal diameter of the rim is sufficiently close to ¾ inches to effectively latch the barbs of a typical metal snap-in cable hanger with interface brackets having nominal ¾ inch spacing when the cable hanger is pinched closed around a nominal ½ inch, ⅝ inch, ⅞ inch, 1¼ inch or 1⅝ inch diameter cable. In addition, the rim also has a thickness slightly less than the clearance of the metal barb head from the body of the snap-in hanger to form a loose fitting latch allowing the spacer to rotate with respect to the snap-in cable hanger. The polymeric legs include locking polymeric barbs that are compressed inward as the barbs are inserted into the ¾ inch diameter receptacle in the adjacent cable hanger or other support member. Once through the hole, the polymeric barbs of the spacer expand outward, securing the spacer to the cable support hanger or other support member, preventing vertical separation.

The polymeric spacer may be manufactured from a UV-stable polymeric material suitable for use as a low-PIM interface between a metal snap-in cable hanger and another metal snap-in cable hanger or other metal support member. The polymeric spacer can also be used to attach a number of metal cable hangers to each other in a stacked configuration. In a particular illustrative embodiment, the spacer is injection-molded, glass-filled Nylon. The polymeric spacer may be molded in sections (e.g., halves) that are solvent welded or adhesive bonded together to form a complete spacer.

Another approach would be to integrally form the spacer onto the cable hanger itself (i.e., create a combined hanger-spacer product). Because each hanger is configured for a specific cable diameter, this approach would require a different hanger-spacer product for every different diameter of cable. The present spacer has the advantages of working with existing cable hangers independent of the cable diameter for a significant range of cable diameters (e.g., half-inch to one-inch diameter cables).

Figure 1:
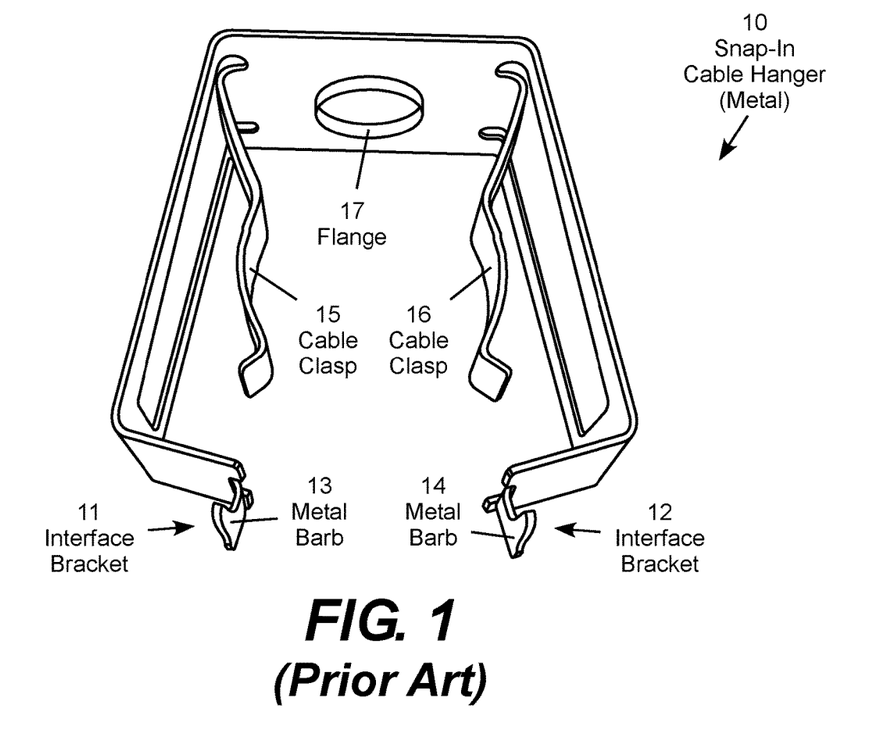
FIG. 1 is a perspective view of a prior art metal cable hanger.

FIG. 1 is a perspective view of a prior art snap-in metal cable hanger 10, which includes a pair of interface brackets 11, 12 that terminate in metal barbs 13, 14 that are used to removably attach the cable hanger to another support member. For example, the interface brackets 11, 12 may be used to secure multiple cable hangers to each other in a stacked configuration or to attach a cable hanger to another metal support member, such as pipe or bracket with an appropriate sized receptacle hole. The cable hanger 10 also includes a receptacle side that includes a flange 17 that defines a receptacle hole sized to accept the metal barbs of an adjacent snap-in cable hanger allowing the cable hangers to be stacked together. Metal sides extend away from the receptacle side forming cable clasps 15, 16 configured to support a cable passing through the hanger. This type of conventional cable hanger creates loose metal-to-metal contact points that have been discovered to generate significant levels of PIM when illuminated by telecommunication signals, for example when used to secure cables behind the antennas at base-station antenna sites.

Figure 2A:
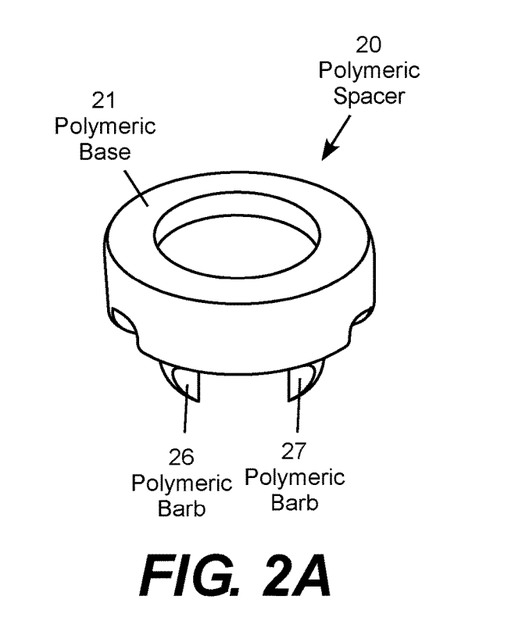
FIG. 2A is a perspective view of a low-PIM, polymeric stackable cable hanger spacer suitable for use with the prior art metal cable hanger.
Figure 2B:
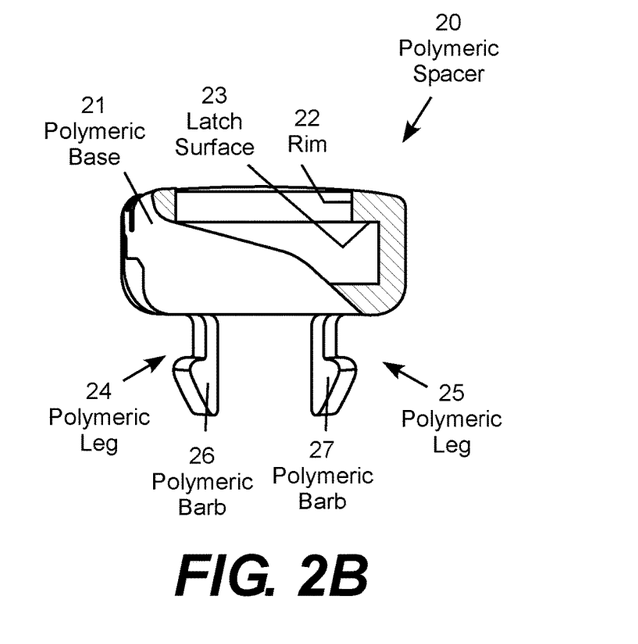
FIG. 2B is a cut-away perspective view of the polymeric spacer.

FIG. 2A is a perspective view and FIG. 2B is a cut-away perspective view of a low-PIM, stackable polymeric spacer 20 suitable for use as a low-PIM interface between a metal cable hanger and another metal cable hanger or other support member. The low-PIM polymeric cable hanger 20 avoids the loose metal-to-metal contact points that have been discovered to generate significant levels of PIM when illuminated by telecommunication signals, for example when used to secure cables behind the antennas at base-station antenna sites. The polymeric spacer 20 Includes a base 21 forming a rim 22 that defines a latch surface 23 configured to capture the locking metal barbs 13, 14 of the interface brackets 11, 12 of the metal snap-in cable hanger 10. In this particular example, the base 21 is configured as a toroidal collar. The base 21 allows the metal barbs 13, 14 to pass through when they are deflected or compressed toward each other. Once clear of the rim 22, the metal barbs 13, 14 spring back to engage the latch surface 23 and become captured by the polymeric spacer 20. In this embodiment, the base 21 has a round toroidal shape with rounded edges allowing the cable hanger 10 to easily rotate at the interface with the spacer 20.

Similarly, the spacer also includes polymeric legs 24, 25 extending from the base 21 with polymeric barbs 26, 27 configured to latch to the flange 17 of an adjacent snap-in cable hanger 10 or similar receptacle hole in another support member. In the stacked cable hanger example, the flange 17 allows the polymeric barbs 26, 27 to pass through when they are deflected or compressed toward each other. Once clear of the flange 17, the polymeric barbs 26, 27 spring back to engage the flange 17 and become captured by the adjacent snap-in cable hanger. The polymeric barbs 26, 27 allow the adjacent cable hanger to easily rotate at the interface with the spacer 20. In different embodiments, the polymeric spacer may include different numbers of polymeric legs with corresponding barbs. For example, illustrative polymeric spacer may include two, three, four or five polymeric legs with corresponding barbs.

Figure 3:
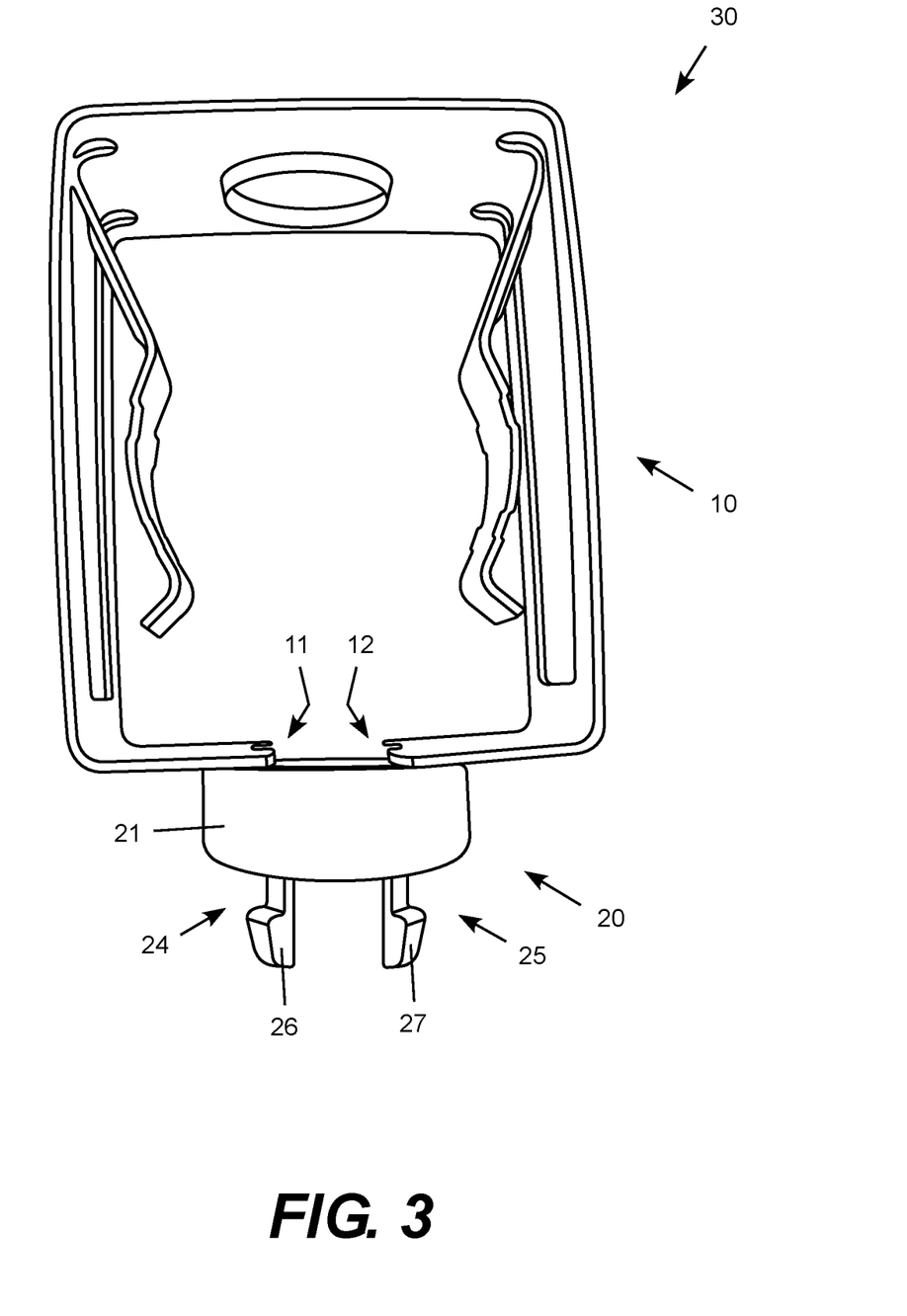
FIG. 3 is a perspective view of a cable hanger assembly including a polymeric spacer and a metal cable hanger.

FIG. 3 is a perspective view of a cable hanger assembly 30 including a polymeric spacer 20 removably attached to a metal cable hanger 10. The interface brackets 11, 12 of the metal snap-in cable hanger 10 are captured by the latch surface of the spacer 20. The base 21 is positioned to form a low-PIM buffer with an adjacent cable hanger (or another metal support member) attached to the spacer by the polymeric barbs 26, 27 on the ends of the polymeric legs 24, 25.

Figure 4:
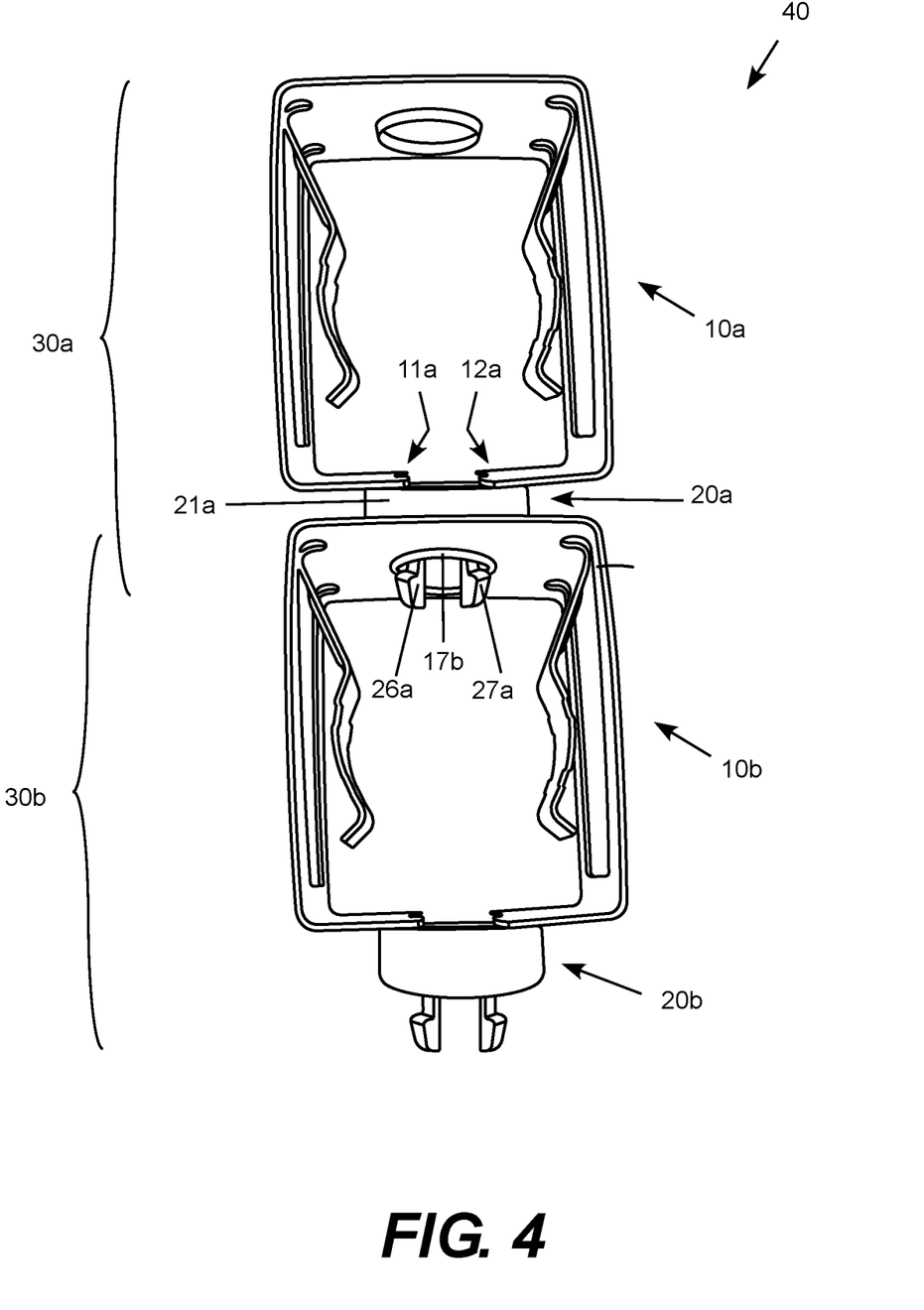
FIG. 4 is a perspective view of two cable hanger assemblies stacked together.

FIG. 4 shows a stacked configuration, in which a first (upper) spacer 20a connects two cable hanger assemblies 30a-30b together. The interface brackets 11a, 12a of the first (upper) metal snap-in cable hanger 10a are captured by the latch surface of the first (upper) spacer 20a. In addition, by the polymeric barbs 26a, 27a of the first (upper) spacer 20a are captured by the flange 17b of the second (lower) cable hanger 10b. The base 21a of the first (upper) spacer 20a is positioned to form a low-PIM buffer between the first and second metal cable hangers 10a-10b. The second (lower) spacer 20b is positioned to form a similar low-PIM interface with another metal cable hanger or other metal support member, such as a pole or bracket.

Figure 5:
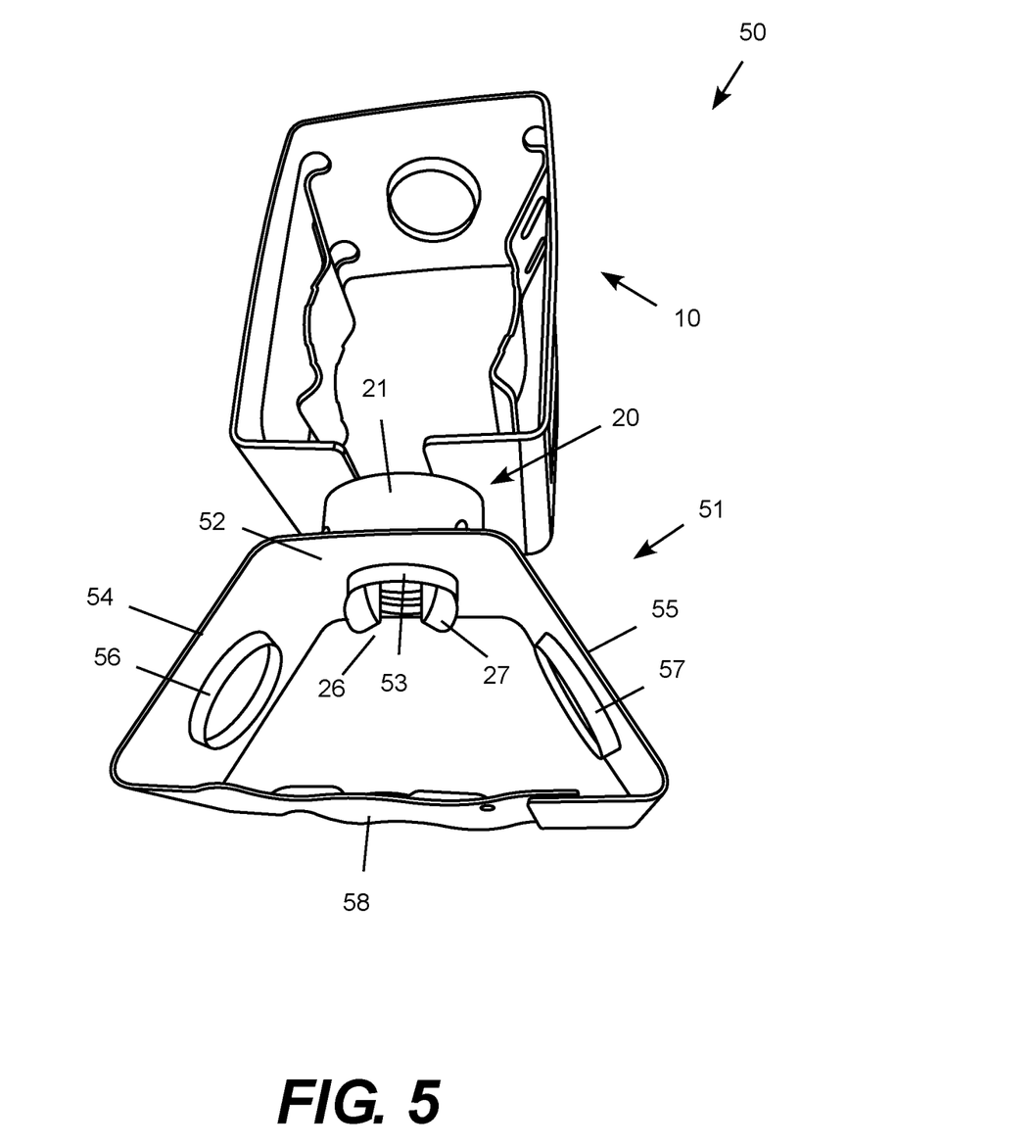
FIG. 5 is a perspective view of a cable hanger assembly stacked together with a trapezoidal cable hanger bracket.

To provide an illustrative example, FIG. 5 is a perspective view of another assembly 50 that includes a cable hanger assembly 10 stacked together with a trapezoidal cable hanger bracket 51. In this arrangement, a polymeric spacer 20 connects the cable hanger assembly 10 to the trapezoidal cable hanger bracket 51. More specifically, the polymeric barbs 26, 27 of the spacer 20 are captured by the flange 53 defining a receptacle hole in a top receptacle side 52 of the trapezoidal cable hanger bracket 51. The trapezoidal cable hanger bracket 51 includes a pair of flared receptacle sides 54, 55 extending away from the top receptacle side 52 at obtuse angles. The flared receptacle sides 54, 55 include flanges 56, 57 defining receptacle holes sized to accept additional polymeric spacers. The flared receptacle sides 54, 55 extend to a bottom side 58, which typically attaches to another support member.

Figure 6:
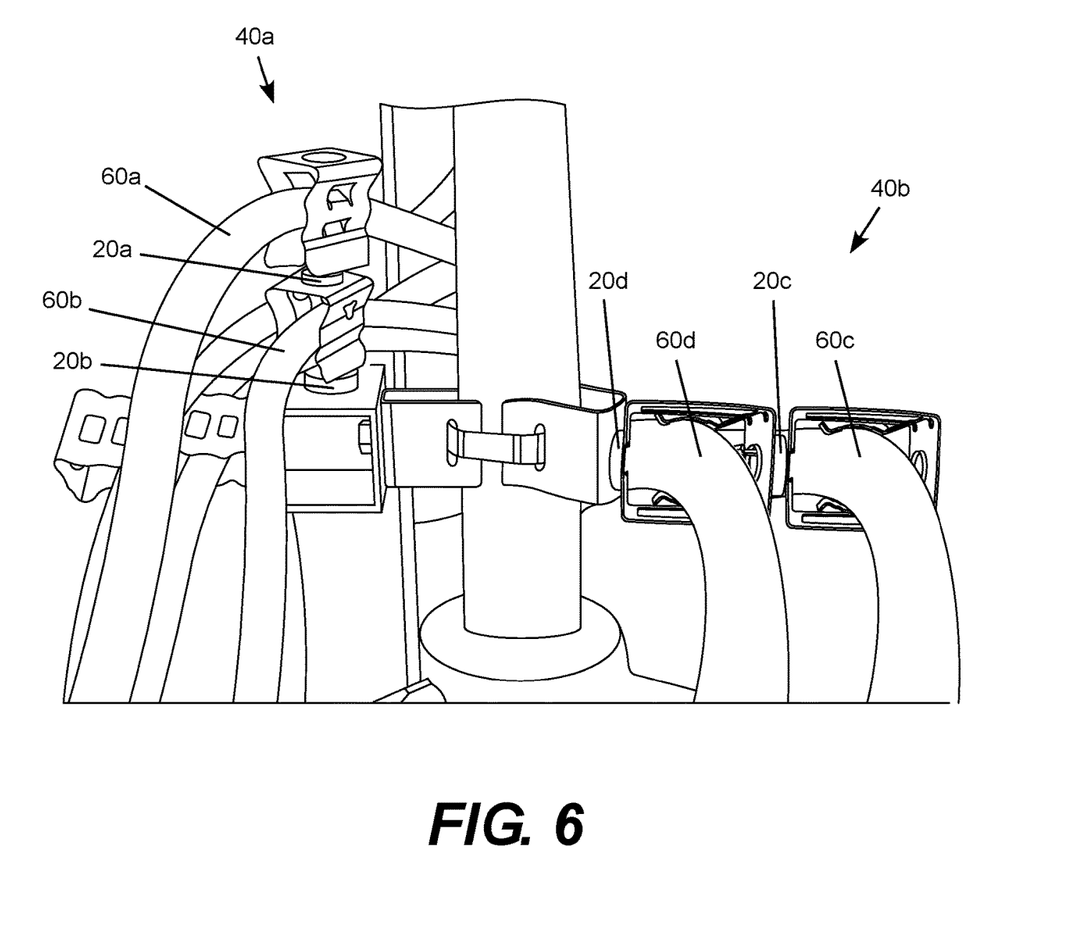
FIG. 6 is a conceptual view of cable hanger assemblies using low-PIM, polymeric stackable cable hanger spacer to support cables.

FIG. 6 shows another illustrative example in which a first cable hanger assembly 40a, which includes a low-PIM, polymeric stackable cable hanger spacers 20a and 20b, supports cables 60a and 60b. Similarly a second cable hanger assembly 40b, which includes low-PIM, polymeric stackable cable hanger spacers 20c and 20d, supports cables 60c and 60d.

Figure 7A:
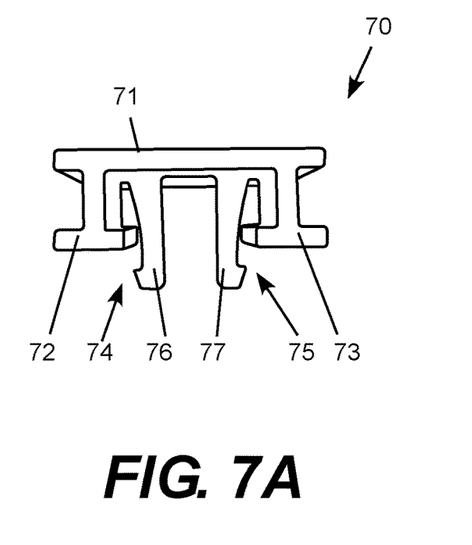
FIG. 7A is a front view of an alternative low-PIM cable hanger spacer.
Figure 7B:
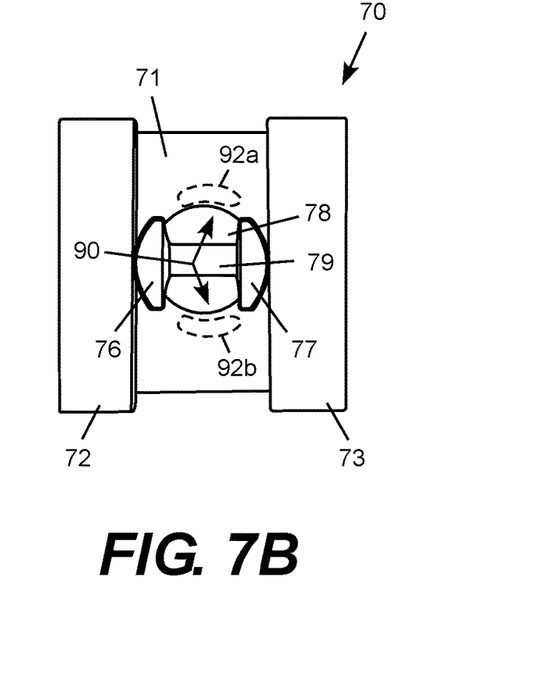
FIG. 7B is a bottom view of the alternative low-PIM cable hanger spacer.
Figure 7C:
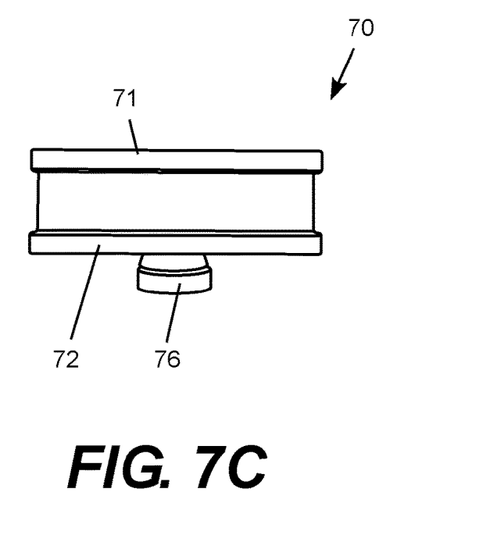
FIG. 7C is a side view of the alternative low-PIM cable hanger spacer.
Figure 7D:
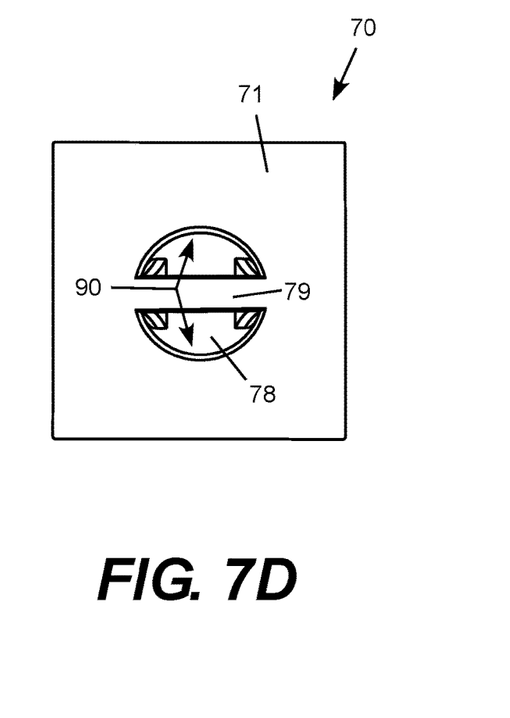
FIG. 7D is a top view of the alternative low-PIM cable hanger spacer.

FIG. 7A is a front view, FIG. 7B is a bottom view, FIG. 7C is a side view, and FIG. 7D is a top view of and alternative low-PIM cable hanger spacer 70. This embodiment includes a polymeric base 71 supported by polymeric struts 71, 72 designed to fit between a metal snap-in cable hanger and an adjacent metal support member, such as another metal snap-in cable hanger or a metal pole or bracket. In this particular example, the base 71 is configured as a square plate. It will be appreciated that the base may have any other suitable shape, such as a rectangular, round, oval or hexagonal plate, an extrusion with a rectangular profile, and so forth. Polymeric legs 74, 75 extending away from the base 71 have polymeric barbs 76, 77, respectively. The barbs are configured to latch the spacer 70 to the adjacent metal support member, as described previously with reference to the spacer 20. The base 71 defines a receptacle hole 78 with as cross support 79. Similar to the polymeric spacer 20 described previously, the base 71 form a rim 90 (in this embodiment the edge of the receptacle hole 78) that defines latch surfaces 92*a-b* (in this embodiment portions of the underside of the base 71 facing toward the polymeric legs 74, 75) for capturing the metal barbs of an adjacent snap-in metal cable hanger.

Figure 8A:
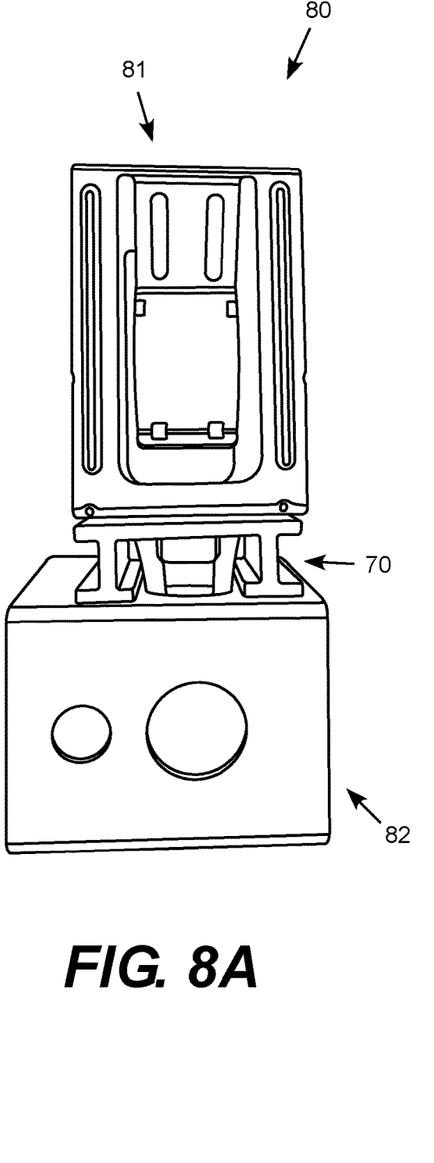
FIG. 8A is a side view of a cable hanger assembly using the alternative low-PIM cable hanger spacer.
Figure 8B:
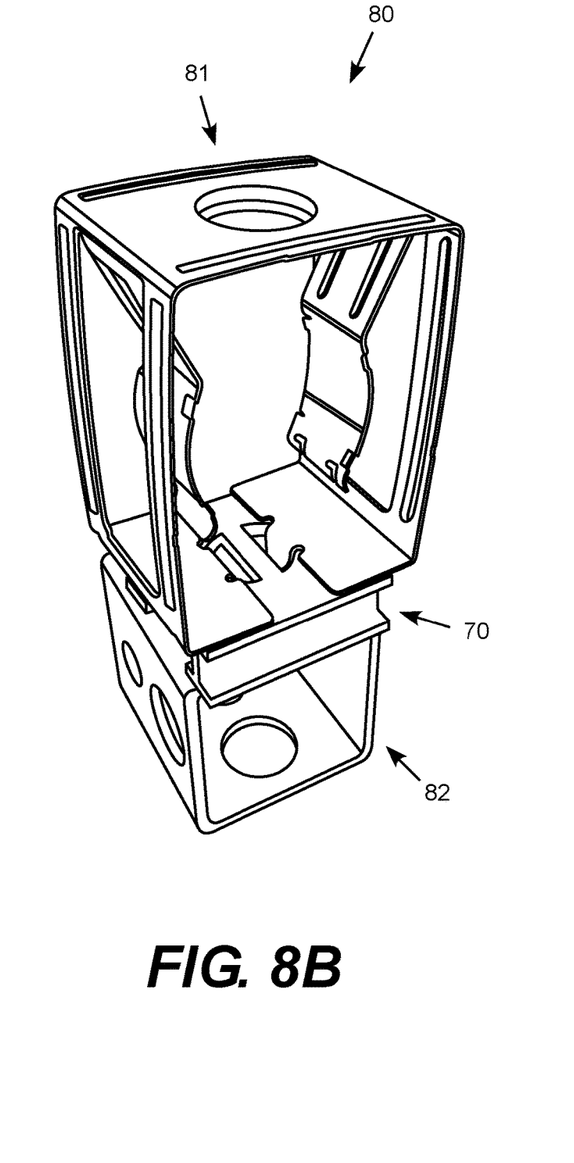
FIG. 8B is a perspective view of the cable hanger assembly using the alternative low-PIM cable hanger spacer.

FIG. 8A is a side view and FIG. 8B is a perspective view of this type cable support assembly, in which the snap-in metal cable hanger 81 has metal barbs captured by the latch surface of the alternative low-PIM cable hanger spacer 70, while the polymeric barbs 76, 77 of the spacer are captured by the metal support member 82. As with the polymeric spacer 20 described previously, the snap-in metal cable hanger 81 and the metal support member 82 can both rotate easily with respect to the alternative polymeric hanger 70, which functions similarly to the polymeric spacer 20 described previously with the added advantage of being easily injection molded as a single piece.

While particular aspects of the present subject matter have been shown and described in detail, it will be apparent to those skilled in the art that, based upon the teachings of this disclosure, changes and modifications may be made without departing from the subject matter described in this disclosure and its broader aspects and, therefore, the appended claims are to encompass within their scope all such changes and modifications as are within the true spirit and scope of the subject matter described in this disclosure. Although particular embodiments of this disclosure have been illustrated, it is apparent that various modifications and embodiments of the disclosure may be made by those skilled in the art without departing from the scope and spirit of the disclosure.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. The disclosure is defined by the following claims, which should be construed to encompass one or more structures or function of one or more of the illustrative embodiments described above, equivalents and obvious variations. It will therefore be appreciated that the present invention provides significant improvements. The foregoing relates only to the exemplary embodiments of the present invention, and that numerous changes may be made therein without departing from the spirit and scope of the invention as defined by the following claims.

The invention claimed is:

1. A low-PIM, stackable polymeric spacer for attachment to a metal cable hanger, wherein the cable hanger comprises a first side spaced apart from a second side, interface brackets extending from the second side, and a cable clasp extending a length dimension from the first side toward the second side, wherein the spacer comprises:
   a non-cable supporting polymeric base extending from a first surface to a second surface, a rim that defines a latch surface for engagement with the interface brackets, and polymeric legs extending from the second surface with polymeric barbs;
   wherein the base defines a height dimension from the first surface to the second surface that is less than the length dimension of the cable clasp of the cable hanger;
   wherein the base is further configured to allow the interface brackets to pass through the first surface of the base when the interface brackets are deflected or compressed toward each other when the interface brackets are inserted into the base; and
   wherein the base is further configured to allow the interface brackets to spring back to engage the latch surface and become latched to the polymeric spacer when the interface brackets clear the rim of the spacer.

2. The low-PIM, stackable polymeric cable hanger spacer of claim 1, wherein the base further comprises a round toroidal shape with rounded edges allowing the metal snap-in cable hanger to rotate with respect to the spacer.

3. The low-PIM, stackable polymeric spacer of claim 1, wherein the rim has an internal diameter corresponding to a nominal spacing of the interface brackets of the cable hanger when the cable hanger is pinched closed around a cable that the cable hanger is designed to support.

4. The low-PIM, stackable polymeric spacer of claim 1, wherein the rim has an internal diameter corresponding to a ¾ inch nominal spacing of the interface brackets of the cable hanger when the cable hanger is pinched closed around a nominal ½ inch, ⅝ inch, ⅞ inch, 1¼ inch or 1⅝ inch diameter cable that the cable hanger is designed to support.

5. The low-PIM, stackable polymeric spacer of claim 1, wherein the spacer comprises a UV-stable polymer.

6. The low-PIM, stackable polymeric spacer of claim 1, wherein the spacer comprises glass-filled Nylon.

7. The low-PIM, stackable polymeric spacer of claim 1, wherein the spacer comprises two injection-molded sections that are solvent welded or adhesive bonded together to form the spacer.

8. The low-PIM, stackable polymeric cable hanger spacer of claim 1, wherein the spacer comprises injection-molded glass-filled Nylon sections that are solvent welded or adhesive bonded together to form the spacer.

9. The low-PIM, stackable polymeric spacer of claim 1, further comprising a cable supported by the cable clasp, wherein the cable defines a cross-sectional dimension, wherein the height dimension of the base of the spacer is less than the cross-sectional dimension of the cable.

10. The low-PIM, stackable polymeric spacer of claim 1, wherein the cable hanger is a first cable hanger, further comprising a second cable hanger comprising the metal support structure.

11. A method for creating a low-PIM interface between a metal cable hanger and an adjacent metal structure, comprising: obtaining a metal cable hanger comprising a first side spaced apart from a second side, interface brackets extending from the second side, and a cable clasp extending a length dimension from the first side toward the second side; obtaining a non-cable supporting polymeric spacer comprising a polymeric base extending from a first surface to a second surface forming a rim that defines a latch surface for latching to the interface brackets, and polymeric legs extending from the second surface of the polymeric base with polymeric barbs for latching to the adjacent metal structure, wherein the polymeric spacer base defines a height dimension from the first surface to the second surface that is less than the length dimension of the cable clasp of the cable hanger, deflecting or compressing the metal barbs toward each other; inserting the metal barbs into the base; allowing the metal barbs to spring back to engage the latch surface and become captured by the polymeric spacer once the metal barbs clear of the rim; latching the interface brackets of the metal cable hanger to the latch surface of the spacer with the first surface of the polymeric base positioned adjacent to the second side of the cable hanger; latching the polymeric barbs of the spacer to a receptacle hole of the adjacent metal structure.

12. The method of claim 11, wherein the base further comprises a round toroidal shape with rounded edges allowing the metal snap-in cable hanger to rotate with respect to the spacer.

13. The method of claim 11, wherein the rim has an internal diameter corresponding to a nominal spacing of the interface brackets of the cable hanger when the cable hanger is pinched closed around a cable that the cable hanger is designed to support.

14. The method of claim 11, wherein the rim has an internal diameter corresponding to a ¾ inch nominal spacing of the interface brackets of the cable hanger when the cable hanger is pinched closed around a nominal ½ inch, ⅝ inch, ⅞ inch, 1¼ inch or 1⅝ inch diameter cable that the cable hanger is designed to support.

15. The method of claim 11, wherein the spacer comprises a UV-stable polymer.

16. The method of claim 11, wherein the spacer comprises glass-filled Nylon.

17. The method of claim 11, further comprising supporting a cable defining a cross-sectional dimensional in the cable clasp, wherein the height dimension of the base of the spacer is less than the cross-sectional dimension of the cable.

18. A cable hanger assembly, comprising:
 a metal cable hanger comprising a first side spaced apart from a second side, interface brackets extending from the second side, and a cable clasp extending a length dimension from the first side toward the second side; and
 a non-cable supporting low-PIM polymeric spacer comprising:
  a polymeric base extending from a first surface to a second surface with the first surface positioned adjacent to the second side of the cable hanger;
  a rim that defines a latch surface engaged with the interface brackets; and
  polymeric legs extending from the second surface of the polymeric base with polymeric barbs latched to an adjacent metal support structure; and
 wherein the polymeric spacer base defines a height dimension from the first surface to the second surface that is less than the length dimension of the cable clasp of the cable hanger;
 wherein the base is further configured to allow the interface brackets to pass through the first surface of the base when the interface brackets are deflected or compressed toward each other when the interface brackets are inserted into the base; and
 wherein the base is further configured to allow the interface brackets to spring back to engage the latch surface and become latched to the polymeric spacer when the interface brackets clear the rim of the spacer.

* * * * *